United States Patent
Adachi

(10) Patent No.: US 7,903,748 B2
(45) Date of Patent: Mar. 8, 2011

(54) TRANSMITTER APPARATUS, COMMUNICATION SYSTEM, AND COMMUNICATION METHOD

(75) Inventor: Fumiyuki Adachi, Sendai (JP)

(73) Assignee: Intelligent Cosmos Research Institute, Sendai-Shi (JP)

( * ) Notice: Subject to any disclaimer, the term of this patent is extended or adjusted under 35 U.S.C. 154(b) by 1211 days.

(21) Appl. No.: 10/575,160

(22) PCT Filed: Oct. 8, 2004

(86) PCT No.: PCT/JP2004/014960
§ 371 (c)(1),
(2), (4) Date: Jul. 10, 2006

(87) PCT Pub. No.: WO2005/036790
PCT Pub. Date: Apr. 21, 2005

(65) Prior Publication Data
US 2007/0053449 A1  Mar. 8, 2007

(30) Foreign Application Priority Data
Oct. 10, 2003  (JP) ................................ 2003-352782

(51) Int. Cl.
*H04L 27/28* (2006.01)
(52) U.S. Cl. ......................................... 375/260; 375/259
(58) Field of Classification Search .................... 375/260
See application file for complete search history.

(56) References Cited

U.S. PATENT DOCUMENTS

| | | | | |
|---|---|---|---|---|
| 5,850,393 A * | 12/1998 | Adachi | ......................... | 370/335 |
| 7,058,134 B2 * | 6/2006 | Sampath | ...................... | 375/260 |
| 2003/0050945 A1 * | 3/2003 | Chen et al. | ..................... | 708/404 |
| 2003/0095498 A1 * | 5/2003 | Sato et al. | ..................... | 370/208 |
| 2003/0117647 A1 * | 6/2003 | Kaku et al. | .................... | 358/1.15 |
| 2003/0210749 A1 * | 11/2003 | Asjadi | ........................... | 375/260 |
| 2005/0018782 A1 * | 1/2005 | Costa et al. | ..................... | 375/260 |
| 2007/0021130 A1 * | 1/2007 | Taira | .............................. | 455/502 |
| 2007/0053449 A1 * | 3/2007 | Adachi | ........................ | 375/260 |
| 2007/0165730 A1 * | 7/2007 | Whinnett et al. | ............. | 375/260 |

(Continued)

FOREIGN PATENT DOCUMENTS

JP  2003-032218  1/2003

(Continued)

OTHER PUBLICATIONS

Koichi Okada, Hiroyuki Uesugi, Shinya Hatayama, Makoto Itami, Koji Ito, "Data Henkan ni yoru OFDM Shingo no Ayamariritsu Tokusei no Kaizen", ITE Technical Report, Feb. 20, 1997, vol. 21, No. 12, pp. 85 to 90.

*Primary Examiner* — Chieh M Fan
*Assistant Examiner* — Santiago Garcia
(74) *Attorney, Agent, or Firm* — Young & Thompson

(57) ABSTRACT

A communication technology for allowing a mobile communication system to accommodate variable rate users, while obtaining a frequency diversity effect. A transmitter apparatus using, for transmission, transmission signals produced based on data symbols of a predetermined transmission method, comprising an FFT processing part for converting the data symbols to frequency domain data; an interleaver for sorting the frequency domain data; and an IFFT processing part for converting the sorted frequency domain data to a time domain signal; wherein the FFT processing part subjects Q received data symbols to Q-point FFT processing, the interleaver produces N data from Q data outputted from the FFT processing part (where N>Q), and the IFFT processing part subjects the N data outputted from the interleaver to N-point IFFT processing.

20 Claims, 12 Drawing Sheets

U.S. PATENT DOCUMENTS

2007/0211668 A1 * 9/2007 Agrawal et al. ............... 370/335

FOREIGN PATENT DOCUMENTS

| JP | 2003-032220 | 9/2003 |
| JP | 2003-249911 | 9/2003 |
| JP | 2003-258763 | 9/2003 |
| WO | WO/02/47304 | 6/2002 |
| WO | WO 03/026193 | 3/2003 |

* cited by examiner

TRANSMITTER APPARATUS, COMMUNICATION SYSTEM, AND COMMUNICATION METHOD

TECHNICAL FIELD

This invention relates to a transmitter apparatus, a communication system and a communication method, and more particularly to a transmitter apparatus preferable for mobile communications, a communication system provided with this transmitter apparatus and a communication method preferable for mobile communications.

BACKGROUND ART

In recent times, the development of a mobile communication industry represented by mobile phones is making rapid progress. With this rapid progress, various services by means of mobile communications are also diversified. Particularly, future needs for mobile communications necessarily move to multimedia communications for integrating and communicating various kinds of data including not only voices but also texts, images and the like, and the combination of those needs and the increase of amount of transmitted information further expected in the future demands the increase of signal transmission speed.

On the other hand, under a mobile communication environment, the deterioration in transmission characteristics is caused by multi-path fading due to the existence of multiple delay paths. Particularly, at the time of transmission of high-speed signals, since not only multi-path fading but also frequency selective fading increases in influence, a technology for overcoming this frequency selective fading is indispensable.

By the way, in an uplink (mobile station base station) of a mobile communication system represented by mobile phones and the like, since multiple mobile stations access the same base station at asynchronous timing, inter-user interference occurs. As technologies for preventing this interference, transmission methods such as DS-CDMA (Direct Sequence-Code Division Multiple Access) transmission, MC-CDMA (Multi-Carrier-Code Division Multiple Access) transmission and the like are used. These transmission methods reduce the inter-user interference while obtaining a frequency diversity effect by giving a specific spreading code to each user, spreading transmission signals in a wide band and performing communication.

However, since the above-mentioned transmission methods are spreading communications in a limited band and inter-user interference remains, the number of users being capable of performing communication at the same time is limited. On the other hand, it is possible also to use the communication giving a specific carrier frequency to each user without spreading (what is called frequency division multiple access: FDMA). However, this communication method has a fatal disadvantage that although no inter-user interference occurs, no frequency diversity effect is obtained and the above-mentioned frequency selective fading cannot be overcome.

Thereupon, there has been published a technique of spread spectra aiming at a frequency diversity effect but making users orthogonal to each other in frequency (non-patent literature 1). This technique repeats a transmission signal block consisting of Q data symbols at L times (that is, the spreading rate is L), gives a frequency offset specific to each user to a repetition sequence of it and performs transmission. Such transmission makes discrete spectra in which Q signal spectra in total appear in frequency points the number of which is L times the inverse number of the period of repetitions (namely, Q×L). As a result, since there are (L−1) sets of free frequency points, this technique arranges transmission signals of L users at maximum so as not to overlap each other (that is, so as to make them orthogonal to each other), performs transmission and enables a reception side to obtain a path diversity effect while preventing inter-user interference.

In relation to the above-mentioned technique at the transmission side, it is often performed that the reception side removes a frequency offset specific to each user from a received signal and then estimates a transmission data block by means of a least mean square error estimation or a matching filter detection. Recently there has been performed a study for applying this technique to the uplink of DS-CDMA (non-patent literature 2).

Non-patent literature 1: M. Schnell and I. de Broeck, and U. Sorger, "A promising new wideband multiple-access Scheme for future mobile communications systems", European Transactions on Telecommunications, VOL. 10, No.4, July-August 1999.
Non-patent literature 2: Yosikazu Goto, Teruhiro Kawamura, Hiroyuki Atarasi, and Mamoru Sawahasi, "Uplink Variable Spreading Rate/Chip Repetition (VSCRF)-CDMA Broad Band Radio Access", Technical Report of the Institute of Electronics, Information and Communications Engineers, RCS2003-67, pp.91-98, Yamagata, June 2003.

DISCLOSURE OF THE INVENTION

Means the Invention Attempts to Solve

The mainstream technologies of mobile phones at present are digital telecommunication technologies of the 1990s (2G (the second generation technologies)) or digital telecommunication technologies of the 2000s (3G (the third generation technologies)) represented by IMT-2000 (International Mobile Telecommunication-2000) and the like, and the disclosure of technologies aiming at being applied to high-speed digital communications being the fourth generation digital telecommunication technologies (4G) (for example, Mobile: 100 Mb/sec, Stationary: 1 Gb/sec) or high-speed speed multimedia telecommunications (simultaneous communication of texts, voices, images and the like, for example) is an urgent need.

And when thinking high-speed multimedia communications in the future (of the third to fourth generations, there are many technical problems which must be solved, and particularly there must be technologies capable of handling variable rate signals in order to cope with high-speed multimedia communications.

However, the above-mentioned transmission techniques have a problem that it is difficult to accommodate variable rate users due to performing FDMA communication by the operation of repeating a data block and giving a frequency offset.

And they have also a problem that in case that there are a very large number of paths being different in delay time in propagation paths, a process of equalizing them is very complicated since a time domain equalization process is performed using a least error estimation or a matching filter detection.

Furthermore, data modulation methods handled up to now are applied only to a single carrier (SC) transmission and a DS-CDMA transmission, and their application range has been limited.

This invention has been performed in consideration of the above-mentioned problems of the prior art, and discloses a technique for enabling accommodation of variable rate users while obtaining a frequency diversity effect as well as a technique being applicable to all transmission methods without limiting ideas of application of this technique to some of transmission methods, and as a result this invention aims at providing a communication apparatus capable of flexibly and properly realizing transition to future high-speed multimedia communications, a communication system provided with this transmitter apparatus, and a communication method preferable for mobile communications.

Means for Solving the Problems

In order to solve the above-mentioned problems and attain the object, according to the invention, a transmitter apparatus for performing transmission using transmission signals generated on the basis of data symbols of a specified transmission method is characterized by comprising an interleaver for generating interleave-processed data being obtained by performing specified rearrangement processes on frequency domain data to which said data symbols are converted and an IFFT processing part for converting said interleave-processed data to time domain signals.

According to the invention, since interleave-processed data obtained by performing specified rearrangement processes on frequency domain data which data symbols are converted into are generated in the interleaver, a signal transmission capable of providing a diversity effect without generating inter-user interference is possible.

And a transmitter apparatus is characterized by further comprising, in the above-mentioned invention, an FFT processing part for converting said data symbols to said frequency domain data.

And a transmitter apparatus is characterized in that, in the above-mentioned invention, said interleaver generates and outputs N pieces of data from Q (N>Q) data symbols inputted.

And a transmitter apparatus is characterized in that, in the above-mentioned invention, said FFT processing part performs Q-point FFT processes on Q pieces of data symbols inputted.

And a transmitter apparatus is characterized in that, in the above-mentioned invention, said IFFT processing part performs N-point IFFT processes on N pieces of data outputted from said interleaver.

And a transmitter apparatus is characterized in that, in the above-mentioned invention, said interleaver is provided with an interleaver memory for storing output data of said FFT processing part, data of Q points outputted from said FFT processing part are written into specified positions in said interleaver memory, and specified N pieces of data including Q pieces of data written into said specified positions and data written into other positions than the positions into which said Q pieces of data are written are read from said interleaver.

And a transmitter apparatus is characterized in that, in the above-mentioned invention, specified N pieces of data read from said interleaver memory are outputted to said IFFT processing part.

And a transmitter apparatus is characterized in that, in the above-mentioned invention, data symbols of said specified transmission method are spread signals (including the case of spreading rate of 1).

And a transmitter apparatus is characterized in that, in the above-mentioned invention, data symbols of said specified transmission method are multi-carrier signals.

And a transmitter apparatus is characterized in that, in the above-mentioned invention, data symbols of said specified transmission method are OFDM signals.

And a transmitter apparatus is characterized in that, in the above-mentioned invention, data symbols of said specified transmission method are data symbols of variable data rate.

And a communication system is a communication system comprising a transmitter apparatus for performing transmission using transmission signals generated on the basis of data symbols of a specified transmission method and a receiver apparatus for restoring said data symbols on the basis of the received reception signals obtained by receiving said transmission signals, said system being characterized in that said transmitter apparatus comprises an interleaver for generating interleave-processed data being obtained by performing specified rearrangement processes on frequency domain data to which said data symbols are converted and an IFFT processing part for converting said interleave-processed data to time domain signals, and said receiver apparatus comprises an FFT processing part for converting time domain signals to frequency domain data and a de-interleaver for generating de-interleave-processed data being obtained by performing specified rearrangement processes on said converted frequency domain data.

And a communication system is characterized, in the above-mentioned invention, by further comprising an FFT processing part for converting said data symbols to said frequency domain data, wherein said receiver apparatus further comprises an IFFT processing part for converting said de-interleave-processed data to time domain signals.

And a communication system is characterized in that, in the above-mentioned invention, said de-interleaver generates and outputs Q pieces of data from N (N>Q) pieces of data inputted.

And a communication system is characterized in that, in the above-mentioned invention, the FFT processing part of said receiver apparatus performs N-point FFT processes on N pieces of reception data which have been received and converted from serial to parallel.

And a communication system is characterized in that, in the above-mentioned invention, said IFFT processing part of said receiver apparatus performs Q-point IFFT processes on Q pieces of rearrangement-processed data outputted from said de-interleaver.

And a communication system is characterized in that, in the above-mentioned invention, said de-interleaver is provided with a de-interleaver memory for storing output data of the FFT processing part of said receiver apparatus, data of N points outputted from the FFT processing part of said receiver apparatus are written into specified positions in said de-interleaver memory, and Q pieces of data written into specified positions as data to be processed out of N pieces of data written into said specified positions are read from said de-interleaver.

And a communication system is characterized in that, in the above-mentioned invention, specified Q pieces of data read from said de-interleaver memory are outputted to the IFFT processing part of said receiver apparatus.

And a communication system is characterized in that, in the above-mentioned invention, data symbols of said specified transmission method are spread signals (including the case of spreading rate of 1).

And a communication system is characterized in that, in the above-mentioned invention, data symbols of said specified transmission method are multi-carrier signals.

And a communication system is characterized in that, in the above-mentioned invention, data symbols of said specified transmission method are OFDM signals.

And a communication method is a transmission method for performing transmission using transmission signals generated on the basis of data symbols of a specified transmission method, said communication method being characterized by comprising an FFT processing step for converting said data symbols to frequency domain signals, an interleave-processing step of performing rearrangement processes on said converted frequency domain signals and an IFFT processing step of converting said frequency domain signals to time domain signals.

And a communication method is characterized in that, in the above-mentioned invention, said interleave-processing step generates and outputs N pieces of data from Q (N>Q) data symbols inputted.

And a communication method is, in the above-mentioned invention, a communication method comprising a transmission step of performing transmission using transmission signals generated on the basis of data symbols of a specified transmission method and a reception step of receiving transmission signals transmitted by said transmission step and restoring said data symbols, said communication system being characterized in that said transmission step comprises an FFT-processing step of converting said data symbols to frequency domain signals, an interleave-processing step of performing interleave processes on said converted frequency domain signals and an IFFT processing step of converting said frequency domain signals to time domain signals, and said reception step comprises an FFT processing step of converting said time domain signals to frequency domain signals, a de-interleave-processing step of performing rearrangement processes on said converted frequency domain signals and an IFFT processing step of converting said frequency domain signals to time domain signals.

And a communication method is characterized in that, in the above-mentioned invention, said interleave-processing step generates and outputs Q pieces of data from Q (N>Q) data symbols inputted and said de-interleave-processing step generates and outputs Q pieces of data from N (Q<N) pieces of data inputted.

Effect of the Invention

Since this invention converts data symbols of spread signals to frequency domain signals and performs a rearrangement process (specified write process or read process) on the converted frequency domain signals by means of an interleaver and a de-interleaver, it is possible to obtain a frequency diversity effect while orthogonalizing transmission signals of many users in frequency.

DESCRIPTION OF THE SYMBOLS 11, 21, 31, 41, 51, 61: S/P converter part
12, 22, 33, 42, 62: FFT processing part
13, 32, 56: Interleaver
14, 24, 57: IFFT processing part
15, 25, 34, 44, 58, 66: P/S converter part
23, 43, 63: De-interleaver
$52_1, 52_Q$: Duplicator part
$53_1, 53_Q$: Spread processing part
$64_1, 64_Q$: Inverse spread processing part

BEST MODE FOR CARRYING OUT THE INVENTION

Embodiments related to a transmitter apparatus according to this invention, a communication system provided with this transmitter apparatus, a communication method applied to these apparatuses and the like are described on the basis of the drawings in the following. This invention is not limited by these embodiments.

(Features of the Invention)

Prior to explaining embodiments of this invention, features possessed by a transmitter apparatus according to this invention, a communication system provided with this transmitter apparatus or a communication method using this invention are enumerated.

This invention has the following features:

(1) Since this invention can deal with all transmission methods entirely in the same way without depending on a particular transmission method (e.g. SC transmission, DS-CDMA transmission, OFDM transmission, MC-CDMA transmission or the like), it makes it possible to generalize the concept of processing means (or processing methods). As a result, even in case that new transmission methods appear in the future, it can be widely applied to those transmission methods.

(2) And since this invention adopts the concept of a process on a frequency axis, it can obtain also a frequency diversity effect while orthogonalizing transmission signals of many users in frequency.

(3) Since a reception side can utilize the function of a frequency domain equalizing process performed up to now as it is, it can suppress the increase of load to be processed.

(4) Since this invention can deal with communications of various transmission rates which are not the same in user data rate at the same time, it increases the flexibility in system.

(5) Since this invention can set a frequency component or a sub-carrier to be assigned to each user at any specified position or can dynamically change it for each communication, the integrity of communication is improved.

Three embodiments related to application of this invention to DS-CDMA transmission, OFDM transmission and MC-CDMA transmission are described in respect to composition and operation as the best mode for carrying out the invention.

Embodiment 1

(Application to DS-CDMA Transmission)

Figure 1:
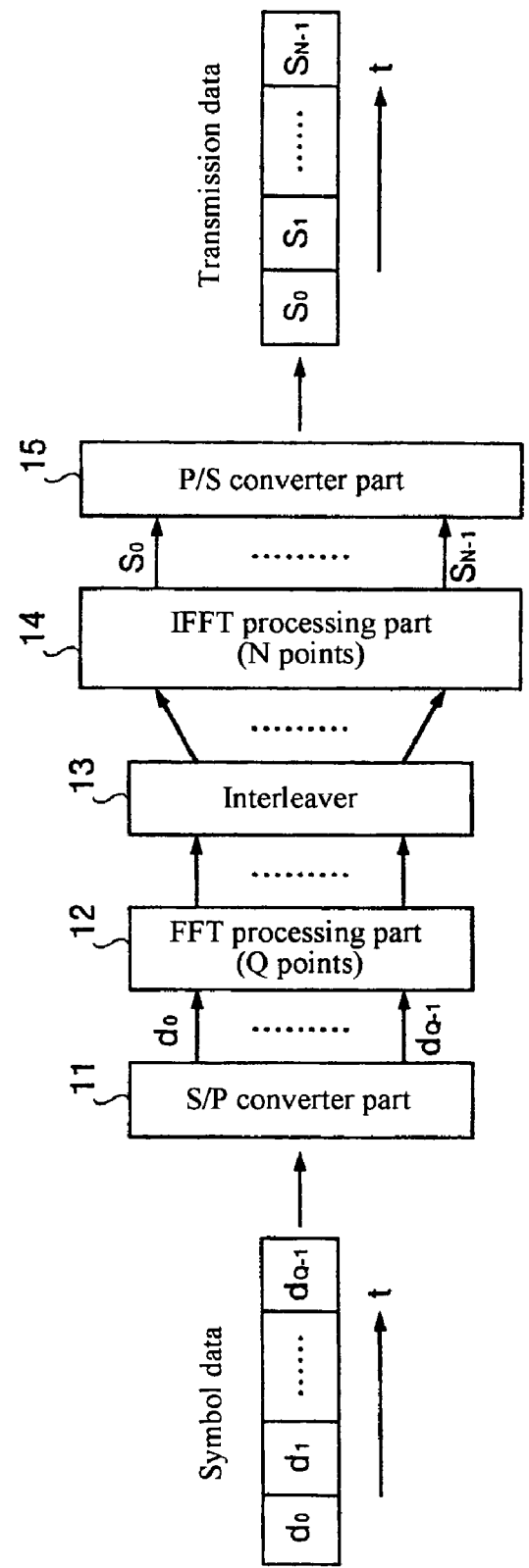
FIG. 1 is a transmission system block diagram showing the composition of a main part of a transmitter apparatus of embodiment 1.
Figure 2:
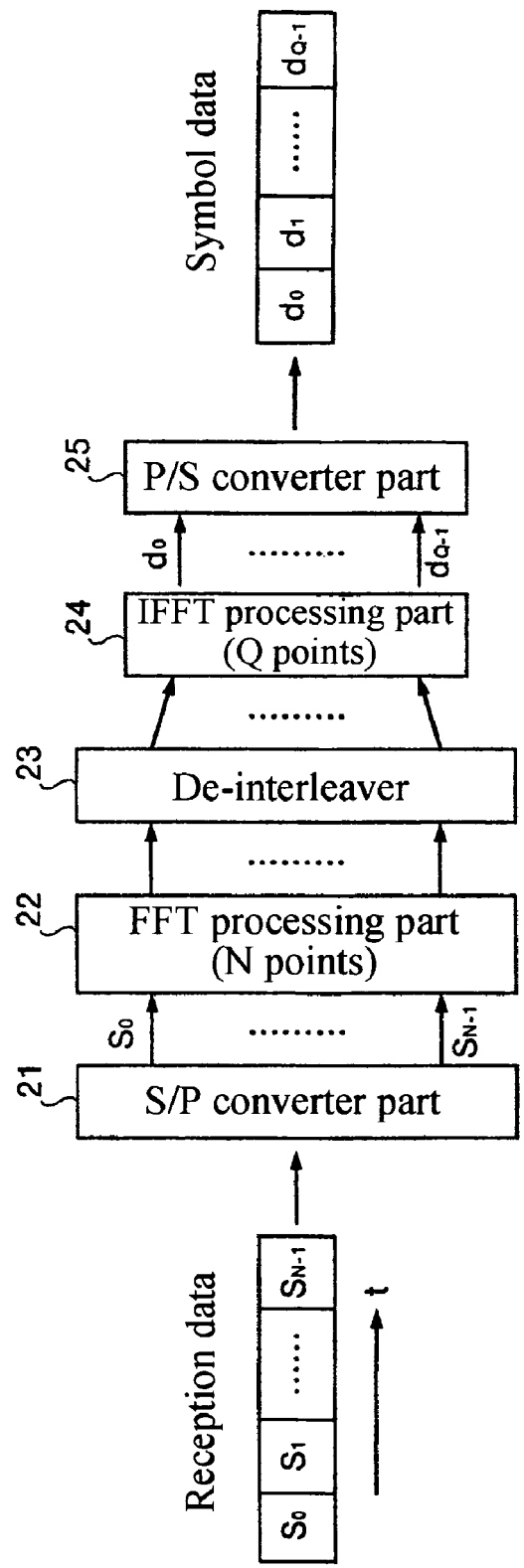
FIG. 2 is a reception system block diagram showing the composition of a main part of a receiver apparatus of embodiment 1.

FIG. 1 is a transmission system block diagram showing the composition of a main part of a transmitter apparatus of embodiment 1. In the transmission system shown in the same figure, symbol data $(d_0, d_1, \ldots, d_{Q-1})$ consisting of a sequence of Q symbols on which a specified modulation is performed for DS-CDMA transmission are inputted. Expression "symbol data" is the same as "data symbol" used in claims and means for solving the problems, but this expression is used for keeping the unity of expression pertaining to other outputs. And the transmission system shown in the same figure is provided with an S/P (serial to parallel) converter part 11 for converting symbol data $(d_i)$ serial-transmitted to parallel data, an FFT processing part 12 for performing fast Fourier transform (FFT: Fast Fourier Transform) processes on the parallel data, an interleaver 13 for performing an interleave process (transmission system write process/transmission system read process) described later on the basis of output data of the FFT processing part 12, an IFFT processing part 14 for performing inverse fast Fourier transform (IFFT: Inverse Fast Fourier Transform) processes on output data of the interleaver 13, and a P/S (parallel to serial) converter part 15 for converting output data of the IFFT processing part 14 to serialized transmission data $(S_0, S_1, \ldots S_{N-1})$ On the other hand, FIG. 2 is a reception system block diagram showing the composition of a main part of a receiver apparatus of embodiment 1. In the reception system shown in the same figure, reception data $(S_0, S_1, \ldots, S_{Q-1})$ obtained by receiving transmission signals transmitted and performing a specified process on them are inputted. And the reception system shown in the same figure is provided with an S/P converter part 21 for converting serial-transmitted reception data $(S_i)$ to parallel data, an FFT processing part 22 for performing fast Fourier transform processes on the parallel data, a de-interleaver 23 for performing a de-interleave process (reception system write process/reception system read process) described later on the basis of output data of the FFT processing part 22, an IFFT processing part 24 for performing inverse fast Fourier transform processes on output data of the de-interleaver 23, and a P/S converter part 25 for converting output data of the IFFT processing part 24 to serial data, namely, original symbol data.

Next, the operations of these transmission system and reception system are described using FIG. 1 and FIG. 2. In FIG. 1, symbol data $(d_i)$ of Q points inputted into the S/P converter part 11 are converted to parallel data and outputted to the FFT processing part 12. In the FFT processing part 12, FFT processes corresponding to the number of processed points (Q) of inputted symbol data (parallel data), namely, Q-point FFT processes are performed and time domain data are converted to frequency domain data and outputted to the interleaver 13. In the interleaver 13, an interleave process (transmission system write process/transmission system read process) based on output data of the FFT processing part 12 (Q-point interleave-processed data) is performed. These transmission system write process and transmission system read process are performed as a specified write process to an interleaver memory provided on the interleaver 13 (illustrated in FIG. 3 and the like) and a specified read process from the interleaver memory. Details of these specified write process/read process are described later.

Further, in the interleaver 13 of FIG. 1, output data on which specified read processes have been performed are outputted as parallel data of N points to the IFFT processing part 14. That is to say, in the interleaver 13, a conversion process of the number of processed points from data of Q points to data of N (N>Q) points is performed. In the IFFT processing part 14, IFFT processes corresponding to the number of processed points (N) of inputted parallel data, namely, N-point IFFT processes are performed and frequency domain data are converted to time domain data and are outputted to the P/S converter part 15. In the P/S converter part 15, transmission data obtained by converting the time domain parallel data to serial data are generated. The transmission data take a specified conversion process such as an up-conversion process for converting them to the transmission signals in a specified frequency band and are transmitted from an antenna apparatus not illustrated. And under certain circumstances, a guard interval for preventing inter-symbol interference caused by multi-path may be inserted.

On the other hand, in the reception system, original symbol data are restored from the above-mentioned transmission data transmitted from the transmission system. That is, in FIG. 2, reception data $(S_i)$ are inputted into the S/P converter part 21. These reception data are data on which specified processes such as a down-conversion process for converting them to base band signals, a guard interval removing process for removing a guard interval inserted at the transmission side, and the like has been performed. In the S/P converter part 21, inputted reception data of N points $(S_i)$ are converted to parallel data and are outputted to the FFT processing part 22. In the FFT processing part 22, FFT processes corresponding to the number of processed points (N) of the inputted symbol data (parallel data), namely, N-point FFT processes are performed, time domain data are converted to frequency domain data and outputted to the de-interleaver 23. In the de-interleaver 23, a process inverse to a process performed by the interleaver 13 of the transmission system, namely, a de-interleave process (reception system write process/reception system read process) based on output data (parallel data of N points) of the FFT processing part 22 is performed. In a similar manner to the transmission system, these reception system write process and reception system read process are respectively performed as a specified write process to a de-interleaver memory provided in the de-interleaver 23 (shown in FIG. 4 and the like) and a specified read process from the interleaver memory. Details of these specified write process/read process are also described later in detail together with the processes in the transmission system.

Further, in the de-interleaver 23 of FIG. 2, output data on which specified read processes have been performed are outputted to the IFFT processing part 14 as parallel data of Q points. That is to say, in the de-interleaver 23, a conversion process of the number of processed points from data of N points to data of Q points, said conversion process being inverse to that of the transmission system, is performed. In the IFFT processing part 24, IFFT processes corresponding to the number of processed points (Q) of inputted parallel data, namely, Q-point IFFT processes are performed, and frequency domain data are converted to time domain data and converted to serial data in the P/S converter part 25 to generate original symbol data.

In the reception system, up to now, a frequency equalizing process using an FFT process has been performed in order to suppress the influence of frequency selective fading. Therefore, in case of performing a de-interleave process of the reception system as described above, it is possible to utilize the function of this frequency equalizing process as it is. In this case, this de-interleave process may be performed before the frequency equalizing process or may be performed after the frequency equalizing process. And as the frequency equalizing process, it is possible to use a maximal-ratio combining (MRC) equalization process, an equal-gain combining (EGC) equalization process, a minimal means square error combining (MMSEC) equalization process or the like being well known in MC-CDMA transmission.

By the way, in the above-mentioned processes of the transmission system and the reception system, the interleaver 13 has a function of assigning (namely, interleaving) specified frequency domains (Q points) to an individual user out of frequency domains (N points) shared by a plurality of users. On the other hand, the de-interleaver 23 has a function of selecting (namely, de-interleaving) specified frequency domains (Q points) assigned to an individual user out of frequency domains (N points) shared by a plurality of users. Therefore, when paying attention to the number of points of data processed at a time (number of processed points), there results in the relation that the number of processed points of the FFT processing part 12 of the transmission system and the number of processed points of the IFFT processing part 24 of the reception system both are Q points, and on the other hand, the number of processed points of the IFFT processing part 14 of the transmission system and the number of processed points of the FFT processing part 22 of the reception system both are N points.

Figure 3:
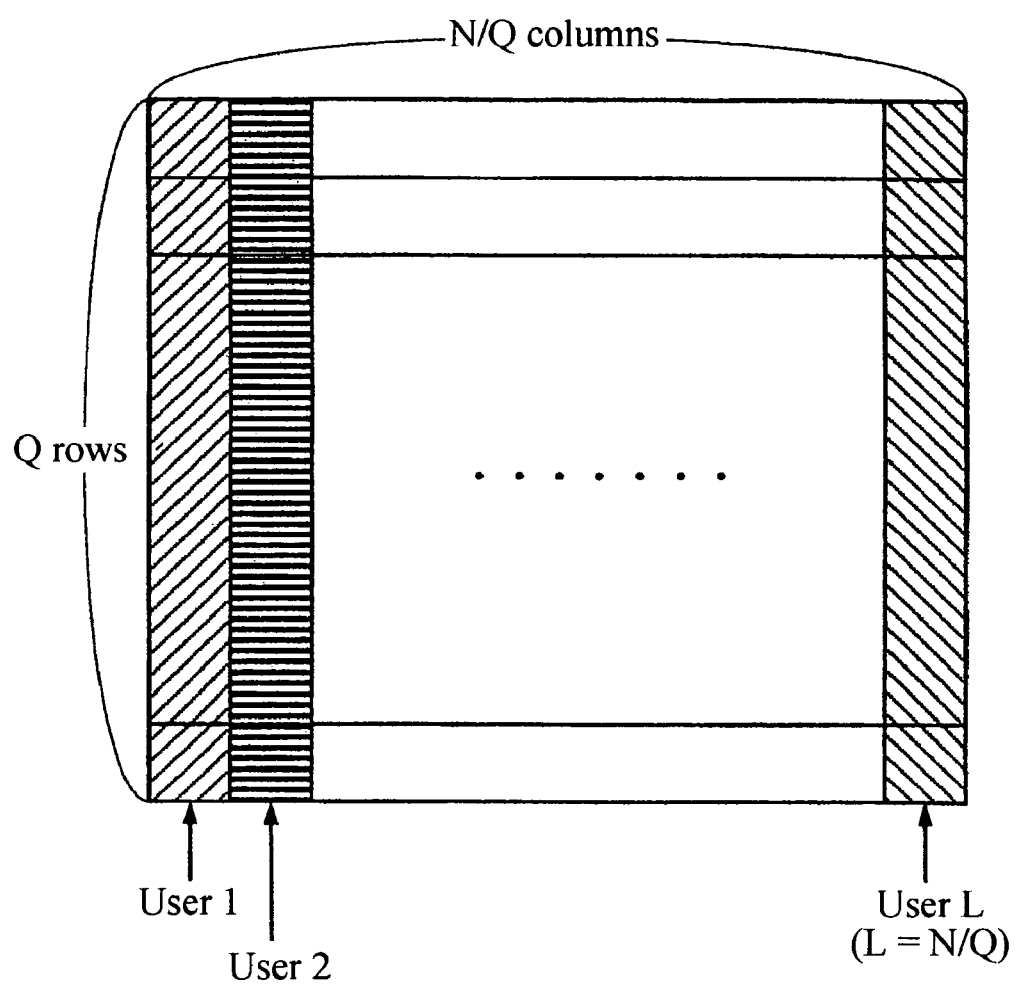
FIG. 3 is a conceptional diagram showing an embodiment of assignment of users (the same data rate) to an interleaver memory.

FIG. 3 is a conceptional diagram showing an embodiment of assignment of users (of the same data rate) to an interleaver memory. And an interleaver memory shown in the same figure shows the concept of a block interleaver of Q rows×(N/Q) columns being the most general. In order to prevent inter-user interference in a signal transmission, signal spectra to be assigned to users must be made not to overlap one another. That is to say, assignment must be performed so that assigned positions in the interleaver memory, being occupied by each user, do not overlap one another among users. Thereupon, in an example shown in FIG. 3, the same Q frequency positions are assigned to each of L (=N/Q) users by assigning one column to each user.

Figure 4:
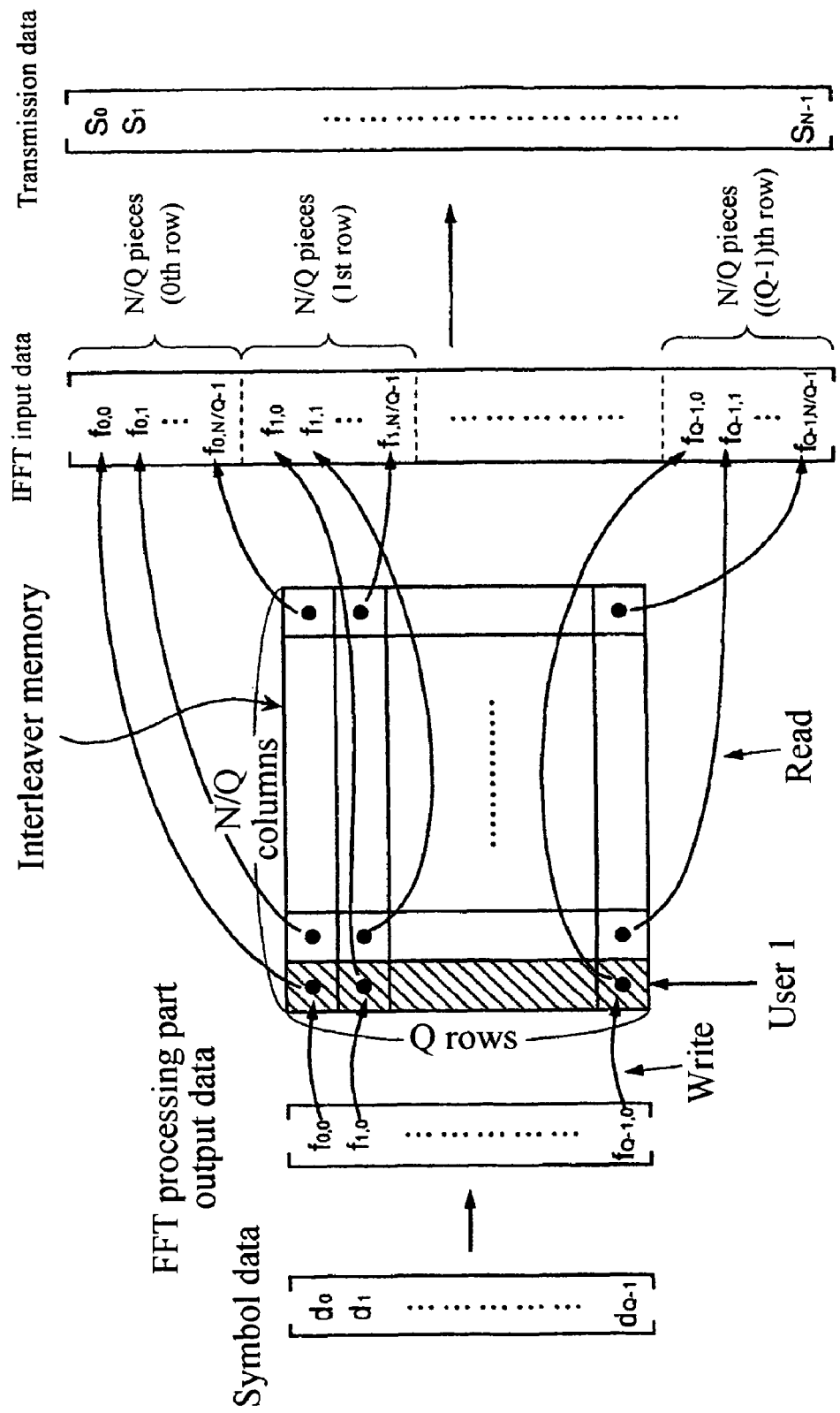
FIG. 4 is a conceptional diagram showing a concept of a write process to an interleaver memory and a concept of a read process from the interleaver memory in the transmission system.

FIG. 4 is a conceptional diagram showing a concept of a write process to an interleaver memory and a concept of a read process from the interleaver memory in the transmission system. Symbol data shown in FIG. 4 are data outputted from the S/P converter part 11 to the FFT processing part 12 in FIG. 1. Similarly in the following, FFT processing part output data shown in FIG. 4 are data outputted from the FFT processing part 12 to the interleaver 13 in FIG. 1, IFFT processing part input data shown in FIG. 4 are data outputted from the interleaver 13 to the IFFT processing part 14 in FIG. 1, and transmission data shown in FIG. 4 are data outputted from the IFFT processing part 14 to the P/S converter part 15 in FIG. 1. And the assignment of users in an interleaver memory shown in FIG. 4 uses the embodiment shown in FIG. 3.

Next, a write process to an interleaver memory is described using FIG. 4. In the same figure, symbol data ($d_0, d_1, \ldots, d_{Q-1}$) of Q points of user 1 are inputted into the FFT processing part 12, are subjected to FFT processes of Q points in the FFT processing part 12, and are outputted to the interleaver 13 as output data ($f_{0,0}, f_{1,0}, \ldots, f_{Q-1,0}$) of the FFT processing part in frequency domains as shown in FIG. 4.

In the interleaver 13, a write process is performed on the interleaver memory in the interleaver 13. As described above, since the assignment of users in the embodiment shown in FIG. 3 is performed in this embodiment, write processes are performed on only the assignment positions related to user 1 (the first column) on the interleaver memory shown in FIG. 4. If these data are data related to user 2, write processes are performed on only the assignment positions related to user 2 (the second column).

Similarly, a read process from the interleaver memory is described using FIG. 4. In the same figure, in the interleaver 13, read processes from the interleaver memory in the interleaver 13 are performed in the column direction in rows (that is, the lateral direction). When read processes of one row are ended, the process moves to the left end of the next row (lower row by one row) and read processes from this position in the column direction are performed. After this, similar read processes are performed and read processes of the lowest row (that is, the (Q-1)th row) are performed, and thereby a series of read processes are ended. In such a way, in these read processes, since all frequency data on the interleaver memory are read, N (=Q×(N/Q)) pieces of data result in being read. It is IFFT processing part input data ($f_{0,0}, f_{0,1}, \ldots, f_{0,Q-1}, f_{1,0}, f_{1,Q-1}, \ldots, f_{1,Q-1}, \ldots, F_{Q-1,0}, f_{Q-1,1}, \ldots, f_{Q-1,Q-1}$) shown in FIG. 4 that show these read data. These IFFT processing part input data are outputted to the IFFT processing part 14 of FIG. 1, are subjected to N-point IFFT processes and are outputted to the P/S converter part 15 as transmission data ($S_0, S_1, \ldots, S_{N-1}$) as shown in FIG. 4.

Figure 5:
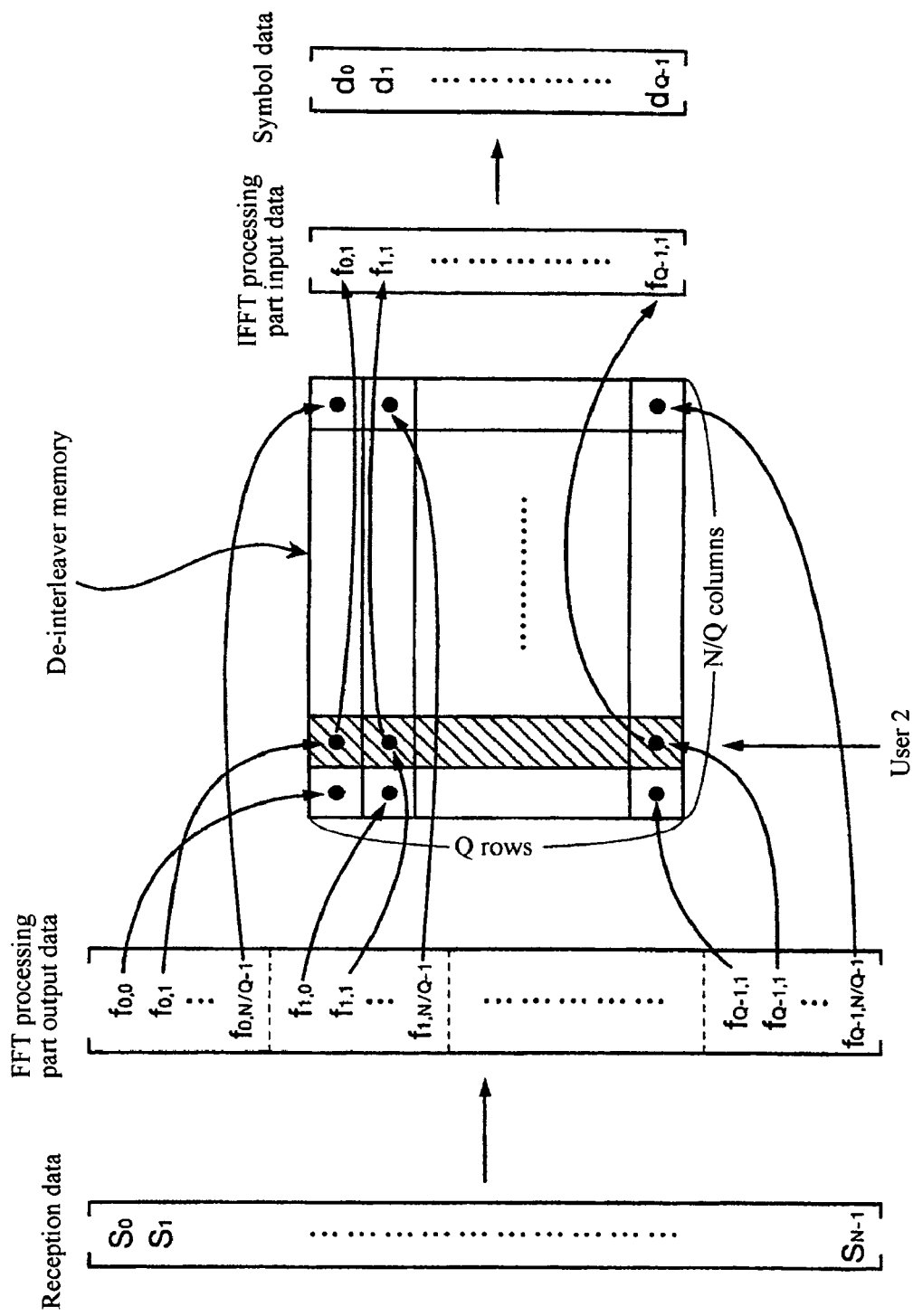
FIG. 5 is a conceptional diagram showing a concept of a write process to a de-interleaver memory and a concept of a read process from the de-interleaver memory in the reception system.

FIG. 5 is a conceptional diagram showing a concept of a write process to a de-interleaver memory and a concept of a read process from the de-interleaver memory in the reception system. Similar to FIG. 4, the relation between each data shown in FIG. 5 and processing parts shown in FIG. 2 is described. Reception data shown in FIG. 5 are data outputted from the S/P converter part 21 to the FFT processing part 22 in FIG. 2. Similarly after this, FFT processing part output data shown in FIG. 5 are data outputted from the FFT processing part 22 to the de-interleaver 23 in FIG. 2, IFFT processing part input data shown in FIG. 5 are data outputted from the de-interleaver 23 to the IFFT processing part 24 in FIG. 2, and symbol data shown in FIG. 5 are data outputted from the IFFT processing part 24 to the P/S converter part 25 in FIG. 2. The assignment of users to a de-interleaver memory shown in FIG. 5 must be the same as the assignment of users to the interleaver memory of FIG. 4.

Next, a write process to a de-interleaver memory is described using FIG. 5. In the same figure, reception data ($S_0, S_1, \ldots, S_{N-1}$) of N points are inputted into the FFT processing part 22, are subjected to N-point FFT processes in the FFT processing part 22 and are outputted to the de-interleaver 23 as FFT processing part output data ($f_{0,0}, f_{0,1}, \ldots, f_{0,Q-1}, f_{1,0}, f_{1,1}, \ldots, f_{1,Q-1}, \ldots, f_{Q-1,0}, f_{Q-1,1}, \ldots, f_{Q-1,Q-1}$) in frequency domains as shown in FIG. 5.

In the de-interleaver 23, a write process to the de-interleaver memory in the de-interleaver 23 is performed. This write process corresponds to the read process from the interleaver memory in the transmission system, and a process inverse to this read process is performed. That is to say, in the de-interleaver 23, write processes in the column direction in rows (that is, the lateral direction) are performed onto the de-interleaver memory in the de-interleaver 23. When write processes of one row are ended, the process moves to the left end of the next row (lower row by one row), and write processes are performed from this position in the column direction. After this, similar write processes are performed and write processes of the lowest row (that is, the (Q-1)th row) are performed, and thereby a series of write processes are ended. In such a way, in these write processes, since all frequency data on the de-interleaver memory are written, N (=Q×(N/Q)) pieces of data result in being written.

Similarly, a read process from the de-interleaver memory is described using FIG. 5. An example of FIG. 5 shows the case of reading data of user 2 in the assignment of users shown in FIG. 4. That is to say, in FIG. 5, the de-interleaver 23 reads in the row direction (downward) only data of the second column into which data of user 2 have been written out of data written into the de-interleaver memory in the de-interleaver 23. Therefore, data read from the de-interleaver memory are Q pieces of frequency domain data, and it is IFFT processing part input data $(f_{0,1}, f_{1,1}, \ldots, f_{Q-1,1})$ shown in FIG. 5 that show these data. These IFFT processing part input data are outputted to the IFFT processing part 24 of FIG. 2, are subjected to Q-point IFFT processes in the IFFT processing part 24 and are outputted as symbol data $(d_0, d_1, \ldots, d_{Q-1})$ to the P/S converter part 25 shown in FIG. 2.

Figure 6:
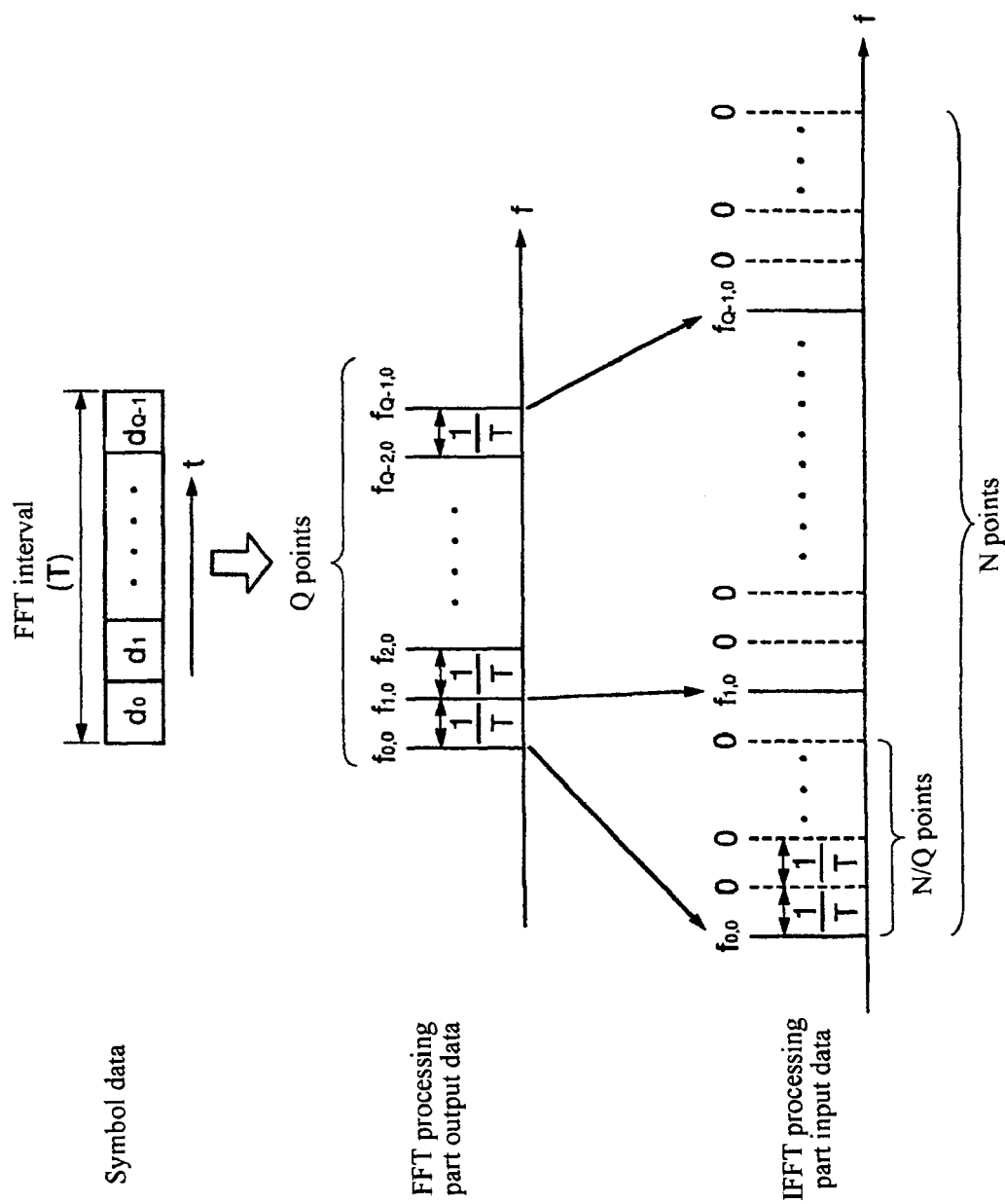
FIG. 6 is an explanatory diagram representing on a frequency axis a concept of a write process to an interleaver memory and a concept of a read process from the interleaver memory in the transmission system.

FIG. 6 is an explanatory diagram representing on the frequency axis a concept of a write process to an interleaver memory and a concept of a read process from the interleaver memory in the transmission system. In the same figure, on the assumption that an FFT interval of symbol data (symbol data of user 1 shown in FIG. 4 are assumed) of Q points inputted into the FFT processing part 12 is (T), in the FFT processing part 12 a frequency sequence of data $(f_{0,0}, f_{1,0}, f_{2,0}, \ldots, f_{Q-1,0})$ being arranged at frequency intervals of 1/T are generated and outputted to the interleaver 13. A write process to the interleaver 13 and a read process from the interleaver 13 are as described above. In case that it is only user 1 that is now communicating at the same time, as data outputted from the interleaver 13 to the IFFT processing part 14, a frequency sequence of data $(f_{0,0}, 0, \ldots, 0, f_{1,0}, 0, \ldots, 0, f_{Q-1,0}, 0, \ldots, 0)$ having (N/Q−1) frequency components of "0" being arranged respectively between the frequency components are generated as shown in FIG. 6 and outputted to the IFFT processing part 14.

In FIG. 6, since frequency spectra of symbol data exist collectively in a certain band, in case that strong frequency selective fading occurs in this band, all symbol data are influenced and the restoration of signals is made difficult. On the other hand, since output data outputted from the interleaver 13, namely, input data into the IFFT processing part 14 have frequency spectra spread in a wide range as shown in FIG. 6, even if the influence of frequency selective fading appears in some of the data, there is not a large influence on the whole and thus the influence of frequency selective fading can be limited.

Figure 7:
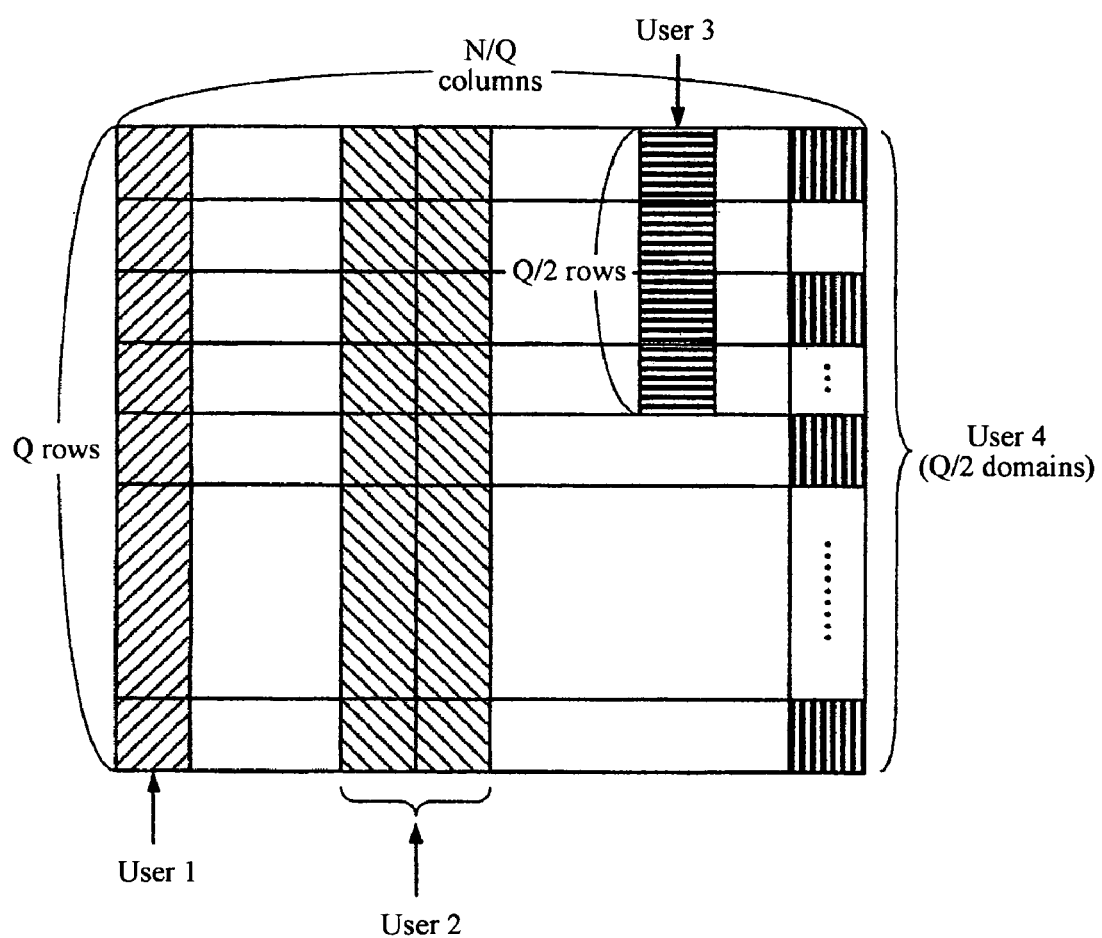
FIG. 7 is a conceptional diagram showing another embodiment of assignment of users (variable data rate) to the interleaver memory.

FIG. 7 is a conceptional diagram showing another embodiment of assignment of users (of variable data rate) to the interleaver memory. Although FIG. 3 shows an example of assignment of a plurality of users communicating at the same data rate to an interleaver memory, FIG. 7 shows an example of assignment of a plurality of users communicating at different (optional) data rate to an interleaver memory. And an interleaver memory shown in FIG. 7 shows the concept of a block interleaver of Q rows×(N/Q) columns being the same as that in FIG. 3.

FIG. 7 assigns domains (domains of two columns) being two times more than the domains of user 1 to user 2 performing communication at a data rate being two times higher than the data rate at which user 1 performs communication. On the other hand, it assigns domains (one column, Q/2 rows) corresponding to half of the domains of user 1 to user 3 performing communication at a data rate being half of the data rate of user 1. Assignment to users 1 to 3 in the interleaver memory is performed on continuous domains in FIGS. 3 and 7 but is not limited to this assignment. For example, in FIG. 7, assignment may be performed to discontinuous domains like the assignment to user 4 performing communication at a data rate of ½ of that of user 1 similarly to user 3. In a word, it is enough that the assignments to users performing communication at the same time do not overlap one another.

Figure 8:
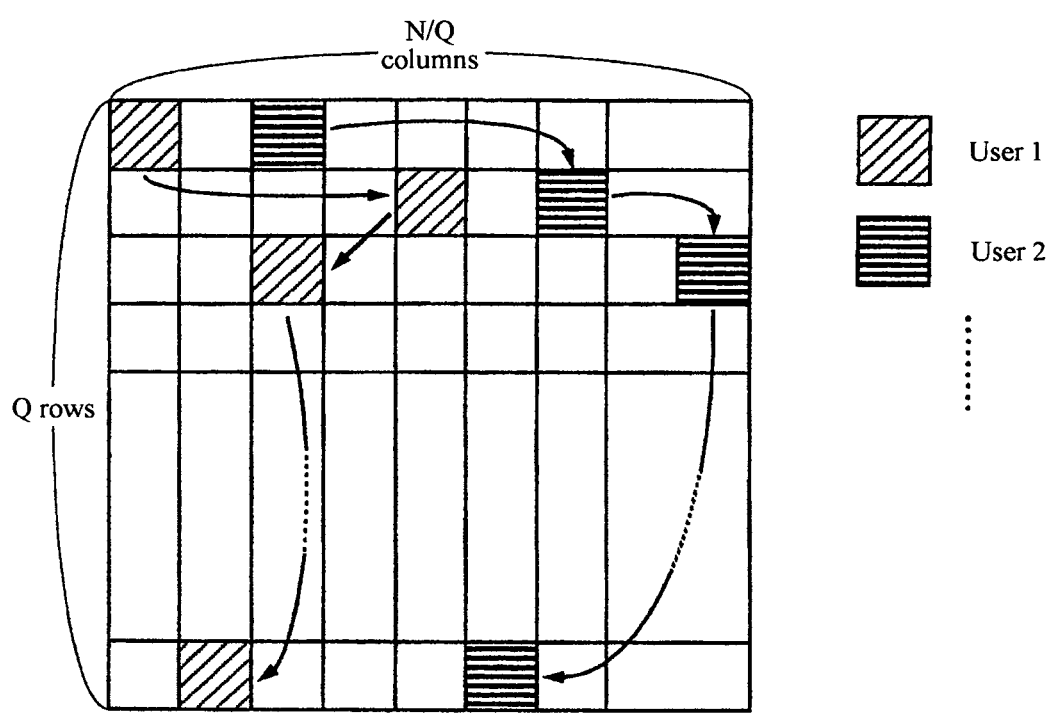
FIG. 8 is a conceptional diagram showing another embodiment of assignment of users (random assignment) to the interleaver memory.

And FIG. 8 is a conceptional diagram showing another embodiment of assignment of users (random assignment) to the interleaver memory. Assignment can be set to specified optional positions in each row like the example of assignment to user 1 and user 2 in the same figure. It is enough that a reception side extracts only necessary data on the basis of assignment information. It is enough that assignment information is decided in advance or communicated in advance by some means. For example, in communication from a mobile station to a base station, it is enough that the base station side instructs in advance from the mobile station side what position data are to be written into in an interleaver memory.

As described above, since a transmitter apparatus and a communication system of this embodiment convert symbol data of spread signals to frequency domain signals and perform rearrangement processes (specified write processes or read processes) on these converted frequency domain signals by means of an interleaver and a de-interleaver, they can provide a frequency diversity effect while orthogonalizing transmission signals of many users in frequency. And since it is possible to utilize the function of a frequency domain equalizing process performed up to now as it is, it is possible to suppress the increase of load to be processed. Further, since it is possible to simultaneously deal with communications of various transmission rates being not the same in user data rate, the flexibility of system can be improved. Furthermore, since it is possible to dynamically change frequency components assigned to users for each communication, the integrity of communication can be improved.

Although in this embodiment an example of application of the concept of an interleave process or de-interleave process to DS-CDMA transmission has been explained, this embodiment can be applied also to SC transmission in a similar manner. That is to say, since it is possible to conceive that SC transmission is a special case (the case of spreading rate of 1) of DS-CDMA transmission, it can be implemented in a similar configuration to the above-mentioned configuration.

Embodiment 2

Figure 9:
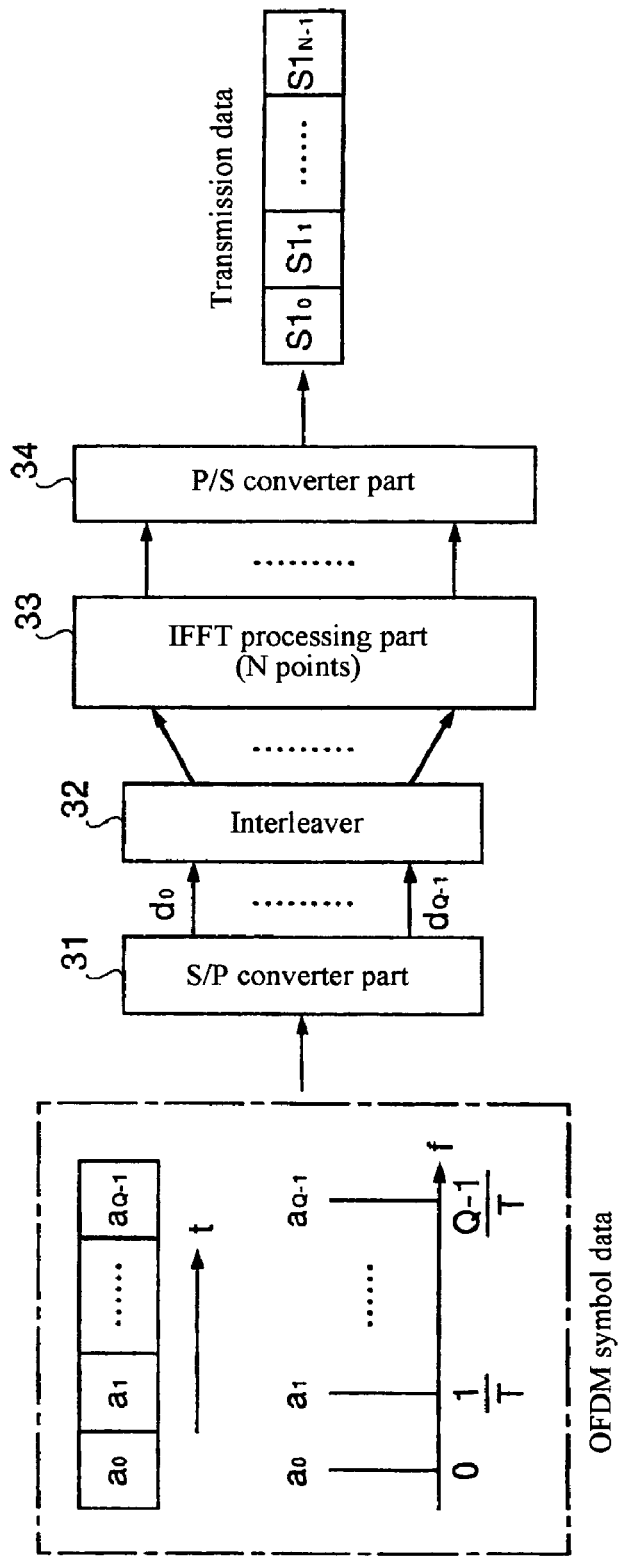
FIG. 9 is a transmission system block diagram showing the composition of a main part of a transmitter apparatus of embodiment 2.
Figure 10:
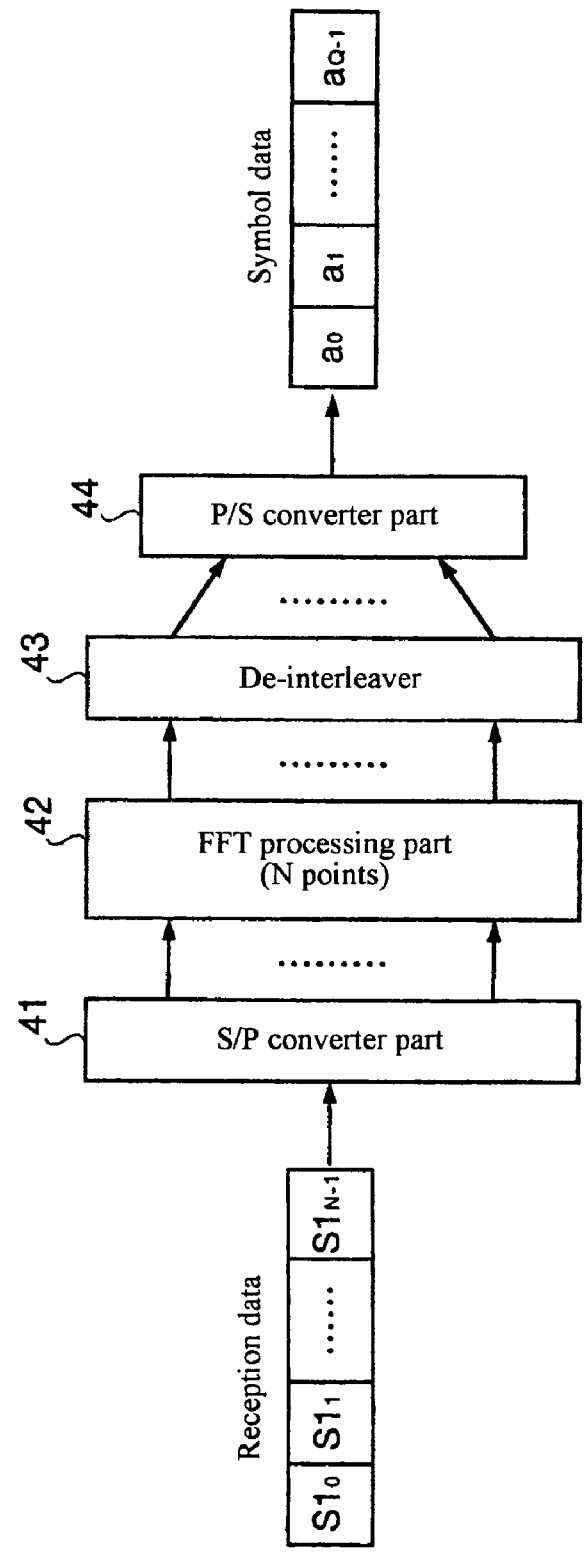
FIG. 10 is a reception system block diagram showing the composition of a main part of a receiver apparatus of embodiment 2.

FIG. 9 is a transmission system block diagram showing the composition of a main part of a transmitter apparatus of embodiment 2 and FIG. 10 is a reception system block diagram showing the composition of a main part of a receiver apparatus of embodiment 2. Although an example of application of an interleave process and de-interleave process being a feature of this invention to a DS-CDMA transmission system has been described in embodiment 1 described above, an example of application of them to an OFDM transmission system is described in embodiment 2.

A transmission system shown in FIG. 9 is provided with an S/P converter part 31 for converting OFDM symbol data $(a_0, a_1, \ldots, a_{Q-1})$ having a spectrum for OFDM transmission as shown in the same figure to parallel data, an interleaver 32 for performing interleave processes similar to embodiment 1 on the basis of these parallel data, an IFFT processing part 33 for performing inverse fast Fourier transform processes on output data of the interleaver 32, and a P/S converter part 34 for restoring output data of the IFFT processing part 33 to serialized transmission data ($S1_0, S1_1, \ldots, S1_{N-1}$).

On the other hand, a reception system shown in FIG. 10 is provided with an S/P converter part 21 for converting reception data ($S1_0, S1_1, \ldots, S1_{N-1}$) obtained by receiving transmitted transmission signals and performing specified processes on the received transmission signals to parallel data, an FFT processing part 42 for performing fast Fourier transform processes on these parallel data, a de-interleaver 43 for performing de-interleave processes similar to embodiment 1 on the basis of output data of the FFT processing part 22, and a P/S converter part 44 for converting output data of the de-interleaver 23 to serial data, namely, original symbol data.

Next, the operations of these transmission system and reception system are described using FIG. 9 and FIG. 10. In FIG. 9, symbol data ($a_i$) of Q points inputted into the S/P converter part 31 are converted to parallel data and outputted to the interleaver 32. Since DS-CDMA signals dealt with in embodiment 1 are dealt with as time domain data, an FFT process is needed at this stage, but since OFDM signals can be dealt with as frequency domain signals, they can be inputted into the interleaver 32 as they are, without being subjected to an FFT process. In the interleaver 32, interleave processes (transmission system write processes/reception system read processes) based on output data (parallel data of Q points) of the S/P converter part 41 are performed. These interleave processes are performed as specified write processes to an interleaver memory provided in the interleaver 32 or specified read processes from the interleaver memory in a similar manner to embodiment 1.

Further, in the interleaver 32 of FIG. 9, output data on which specified read processes have been performed are outputted to the IFFT processing part 33 as parallel data of N points. That is to say, in a similar manner to embodiment 1 in the interleaver 32, data of Q points are converted to data of N (N>Q) points and outputted. In the IFFT processing part 33, N-point IFFT processes are performed, and frequency domain data are converted to time domain data and outputted to the P/S converter part 34. In the P/S converter part 34, transmission data obtained by converting time domain parallel data to serial data are generated. These transmission data are subjected to specified conversion processes such as a guard interval insertion process for preventing inter-symbol interference caused by multi-path, an up-conversion process for converting the data to transmission signals in a specified frequency band and the like, and are transmitted from an antenna apparatus not illustrated.

On the other hand, in the reception system, original symbol data are restored from transmission data transmitted from the transmission system. That is to say, in FIG. 10, reception data ($S1_i$) generated by specified processes such as a down-conversion process, a guard interval removing process and the like are inputted into the S/P converter part 41. In the S/P converter part 41, reception data ($S1_i$) of N points are converted to parallel data and outputted to the FFT processing part 42. In the FFT processing part 42, N-point FFT processes are performed, and the data are converted to frequency domain data and outputted to the de-interleaver 43. In the de-interleaver 43, in a similar manner to embodiment 1, processes inverse to the processes performed in the interleaver 32 of the transmission system, namely, de-interleave processes (reception system write processes/reception system read processes) based on output data of N points of the S/P converter part 41 are performed. These de-interleave processes are performed as specified write processes to a de-interleaver memory (illustrated in FIG. 4 and the like) provided in the de-interleaver 43 or specified read processes from the de-interleaver memory in a similar manner to embodiment 1. In the de-interleaver 43, output data on which specified read processes have been performed are outputted to the P/S converter part 44 as parallel data of Q points. In the P/S converter part 44, output data (parallel data) from the de-interleaver 43 are converted to serial data and thus original symbol data are generated.

As described at the beginning, it has been described that a frequency diversity effect is obtained while orthogonalizing transmission signals of many users in frequency by adopting the concept of processing on the frequency axis as one of features of this invention. On the other hand, since the concept of processing on the frequency axis is included in the concept of OFDM transmission, as seen apparently from comparing FIG. 1 with FIG. 9 or FIG. 2 with FIG. 10, it can be understood that in the transmission system or the reception system one of an FFT processing part and an IFFT processing part is unnecessary and the system is simplified.

As described above, since a transmitter apparatus, a communication system and a communication method of this embodiment convert symbol data of spread signals to frequency domain signals and perform rearrangement processes (specified write processes or read processes) on these converted frequency domain signals by means of an interleaver and a de-interleaver, they can provide a frequency diversity effect while orthogonalizing transmission signals of many users in frequency. And since it is possible to utilize the function of a frequency domain equalizing process performed up to now as it is, it is possible to suppress the increase of load to be processed. Further, since it is possible to simultaneously deal with communications of various transmission rates being not the same in user data rate, the flexibility of system can be improved. Furthermore, since it is possible to dynamically change sub-carriers assigned to users, the integrity of communication can be improved.

Embodiment 3

Figure 11:
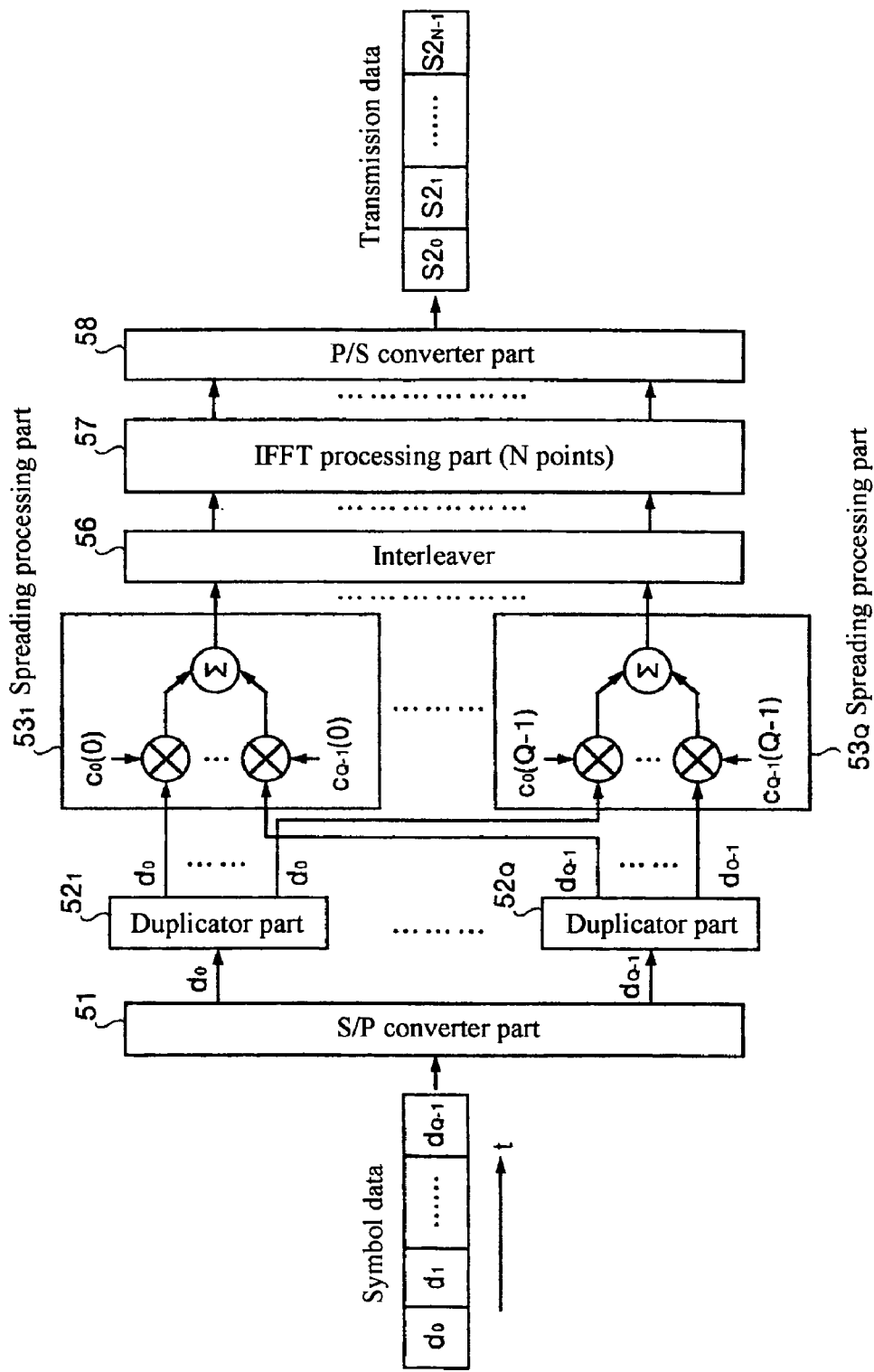
FIG. 11 is a transmission system block diagram showing the composition of a main part of a transmitter apparatus of embodiment 3.
Figure 12:
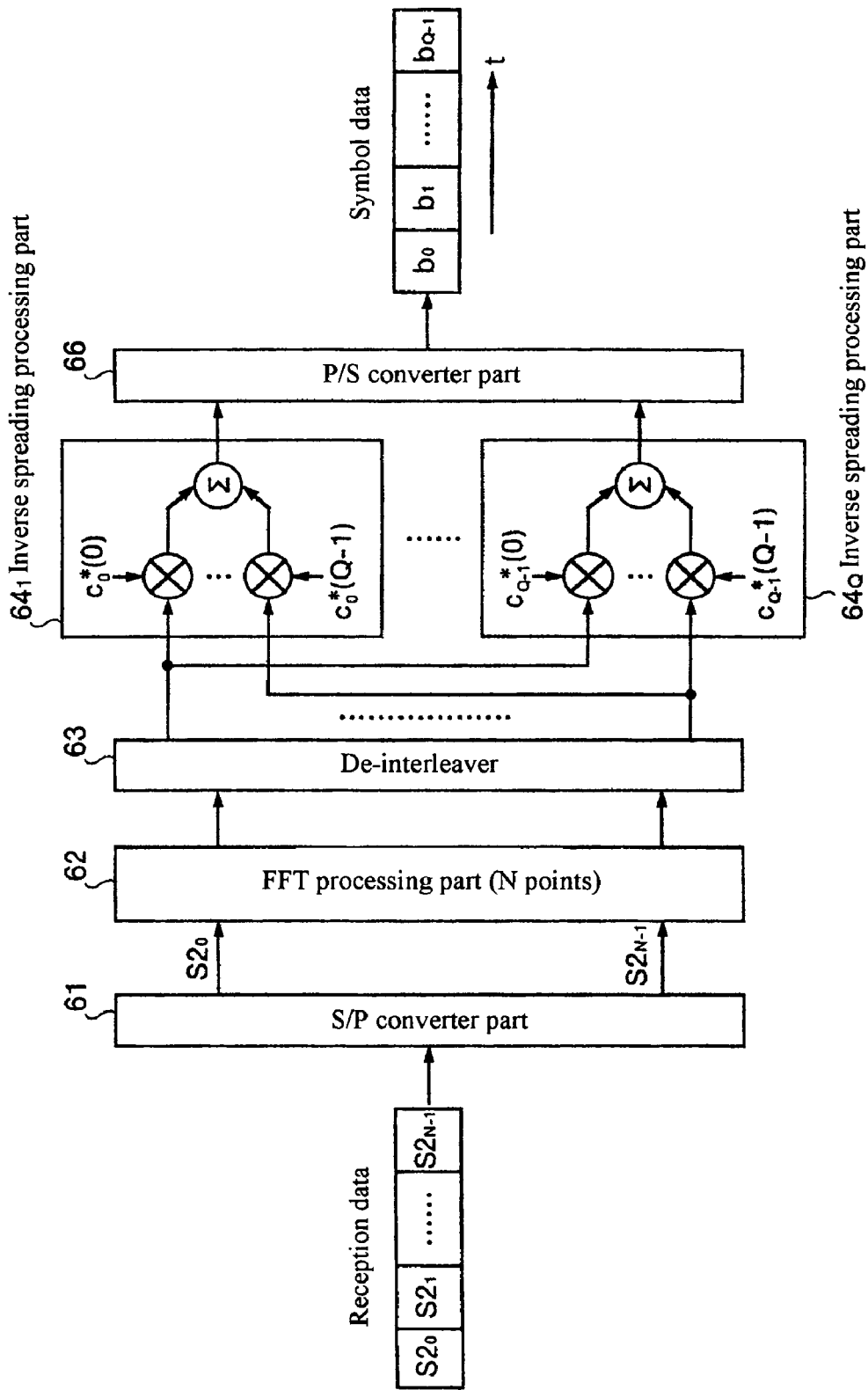
FIG. 12 is a reception system block diagram showing the composition of a main part of a receiver apparatus of embodiment 3.

FIG. 11 is a transmission system block diagram showing the composition of a main part of a transmitter apparatus of embodiment 3. FIG. 12 is a reception system block diagram showing the composition of a main part of a receiver apparatus of embodiment 3. Although an example of application of an interleave process and de-interleave process being a feature of this invention to a DS-CDMA transmission system or an OFDM transmission system has been described in the above-mentioned embodiments 1 and 2, an example of application of them to an MC-CDMA transmission system is described in embodiment 3.

A transmission system shown in FIG. 11 is provided with an S/P converter part 51 for converting symbol data ($b_0, b_1, \ldots, b_{Q-1}$) for MC-CDMA transmission to parallel data, duplicator parts $52_1$ to $52_Q$ for respectively duplicating each piece of these parallel data by a specified number of pieces, spreading processing parts $53_1$ to $53_Q$ for generating spread signals on the basis of signals outputted from the duplicator parts $52_1$ to $52_Q$, an interleaver 56 for performing interleave processes similar to that of embodiments 1 and 2, an IFFT processing part 57 for performing inverse fast Fourier transform processes on output data of the interleaver 56, and a P/S converter part 58 for restoring output data of the IFFT processing part 57 to serialized transmission data ($S2_0, S2_1, \ldots, S2_{N-1}$).

On the other hand, a reception system shown in FIG. 12 is provided with an S/P converter part 61 for converting reception data ($S2_0, S2_1, \ldots, S2_{Q-1}$) obtained by receiving transmitted transmission signals and performing specified processes on the received transmission signals to parallel data, an FFT processing part 62 for performing fast Fourier transform processes on these parallel data, a de-interleaver 63 for performing de-interleave processes similar to embodiments 1 and 2 on the basis of output data of the FFT processing part 62, inverse spreading processing parts $64_1$ to $64_Q$ for restoring original spread signals on the basis of output data of the de-interleaver 63, and a P/S converter part 66 for converting output data of the inverse spreading processing parts $64_1$ to $64_Q$ to serial data, namely, original symbol data.

Next, the operations of these transmission system and reception system are described using FIG. 11 and FIG. 12. In FIG. 11, symbol data ($b_i$) of Q points inputted into the S/P converter part 51 are converted to parallel data and outputted to the duplicator parts $52_1$ to $52_Q$. In the duplicator parts $52_1$ to $52_Q$, each piece of symbol data is respectively duplicated into SF pieces of symbol data (SF: spreading rate) and the duplicated pieces of symbol data are outputted to the spreading processing parts $53_1$ to $53_Q$. In FIG. 11, the spreading rate SF is made to be the same as Q (SF=Q). In the spreading processing parts $53_1$ to $53_Q$, spread signals are generated by multiplying the inputted respective symbol data by an orthogonal spread symbol sequence [$C_i(0)$ to $C_i(Q-1)$, i=0 to (Q-1)] such as W-H sequence code and the like for example, and are outputted to the interleaver 56. In the interleaver 56, interleave processes (transmission system write processes/reception system read processes) based on output data (parallel data of Q points) of the spreading processing parts $53_1$ to $53_Q$ are performed. These interleave processes are performed as specified write processes to an interleaver memory provided in the interleaver 56 or specified read processes from the interleaver memory in a similar manner to embodiments 1 and 2.

Further, in the interleaver 56 of FIG. 11, output data on which specified read processes have been performed are outputted to the IFFT processing part 57 as parallel data of N points. In the IFFT processing part 57, N-point IFFT processes based on N sub-carriers are performed, and frequency domain data are converted to time domain data and outputted to the P/S converter part 58. In the P/S converter part 58, transmission data obtained by converting time domain parallel data to serial data are generated. In the similar manner to embodiment 2, these transmission data are subjected to specified conversion processes such as a guard interval insertion process, an up-conversion process and the like, and are transmitted from an antenna apparatus not illustrated.

On the other hand, in the reception system, original symbol data are restored from transmission data transmitted from the transmission system. That is to say, in FIG. 12, reception data ($S2_i$) generated by specified processes such as a down-conversion process, a guard interval removing process and the like are inputted into the S/P converter part 61. In the S/P converter part 61, reception data ($S2_i$) of N points are converted to parallel data and outputted to the FFT processing part 62. In the FFT processing part 62, N-point FFT processes are performed, and the processed data are converted to frequency domain data and outputted to the de-interleaver 63. In the de-interleaver 63, in a similar manner to embodiment 1, processes inverse to the processes performed in the interleaver 56 of the transmission system, namely, de-interleave processes (reception system write processes/reception system read processes) based on output data of N points of the S/P converter part 61 are performed. These de-interleave processes are performed as specified write processes to a de-interleaver memory (illustrated in FIG. 5 and the like) provided in the de-interleaver 63 or specified read processes from the de-interleaver memory in a similar manner to embodiment 1. In the de-interleaver 63, output data on which specified read processes have been performed are outputted, respectively, to the inverse spreading processing parts $64_1$ to $64_Q$ as parallel data of Q points. In the inverse spreading processing parts $64_1$ to $64_Q$, inverse spreading processes for respectively multiplying and then adding the parallel data of Q points by an orthogonal spread symbol sequence [$C_i^*(0)$ to $C_i^*(Q-1)$, i=0 to (Q-1)] being complex conjugate to the orthogonal spread symbol sequence [$C_i(0)$ to $C_i(Q-1)$, i=0 to (Q-1)] used in an SF sub-carrier transmission system are performed and the results of processing are outputted to the P/S converter part 66. In the P/S converter part 66, the output data (parallel data) are converted to serial data to generate original OFDM symbol data.

MC-CDMA transmission is characterized in that it performs a spreading process in a frequency domain and includes the concept of processing on the frequency axis in the same way as OFDM transmission. As described above, therefore, the MC-CDMA transmission can have functions of an interleave process in the transmission system and a de-interleave process in the reception system added to it, and can simply and effectively realize a system configuration capable of limiting the influence of frequency selective fading.

As described above, since a transmitter apparatus and a communication system of this embodiment convert symbol data of spread signals to frequency domain signals and perform rearrangement processes (specified write processes or read processes) on these converted frequency domain signals by means of an interleaver and a de-interleaver, they can provide a frequency diversity effect while orthogonalizing transmission signals of many users in frequency. And since it is possible to utilize the function of a frequency domain equalizing process performed up to now as it is, it is possible to suppress the increase of load to be processed. Further, since it is possible to simultaneously deal with communications of various transmission rates being not the same in user data rate, the flexibility of system can be improved. Furthermore, since it is possible to dynamically change sub-carriers assigned to users for each communication, the integrity of communication can be improved.

Although the concept of a block interleaver of Q rows×(N/Q) columns being the most general as an interleaver memory has been shown and described throughout embodiments 1 to 3, this invention is not limited to this block interleaver but may use other concepts such as a convolutional interleaver and the like for example.

INDUSTRIAL APPLICABILITY

As described above, a transmitter apparatus or a communication system according to this invention is useful as a transmitter apparatus or a communication system in a mobile communication system, and particularly is optimal as a transmitter apparatus or a communication system in a land mobile communication system in which the influence of frequency selective fading comes into question.

The invention claimed is:

1. A transmitter apparatus for performing transmission using transmission signals generated on the basis of data symbols of a specified transmission method, said transmitter apparatus, comprising:
  an FFT processing part configured to generate frequency domain data from the data symbols;
  an interleaver configured to generate interleave-processed data by performing specified rearrangement processes on the frequency domain data converted by said FFT processing part, said interleaver having an interleaver memory for storing the frequency domain data generated by said FFT processing part; and an IFFT processing part configured to convert said interleave-processed data to time domain signals, wherein said interleaver generates and outputs N data points to the IFFT processing part from Q data points inputted to the interleaver from the FFT processing part, N being greater than Q, wherein the interleaver comprises an interleaver memory having Q rows and N/Q columns, wherein the interleaver is configured to write Q data points received from said FFT processing part into a column of the interleaver memory, the data points of any column being associated with only one user, and wherein the interleaver is configured to read Q×N/Q data points ordered by row from the interleaver memory to the IFFT processing part.

2. The transmitter apparatus according to claim 1, wherein said FFT processing part performs Q-point FFT processes on Q data points inputted.

3. The transmitter apparatus according to claim 1, wherein said IFFT processing part performs N-point IFFT processes on N data points outputted from said interleaver.

4. The transmitter apparatus according to claim 1, wherein
Q data points outputted from said FFT processing part are written into specified positions in said interleaver memory, and
the N data points, including the Q data points written into said specified positions and other data points written into positions other than the specified positions of said Q data points are read from said interleaver and outputted to said IFFT processing part.

5. The transmitter apparatus according to claim 1, wherein said N data points are read from said interleaver memory and outputted to said IFFT processing part.

6. The transmitter apparatus according to claim 1, wherein the data symbols of said specified transmission method are spread signals.

7. The transmitter apparatus according to claim 1, wherein the data symbols of said specified transmission method are multi-carrier signals.

8. The transmitter apparatus according to claim 1, wherein the data symbols of said specified transmission method are OFDM signals.

9. The transmitter apparatus according to claim 1, wherein the data symbols of said specified transmission method are data symbols of variable data rate.

10. A communication system comprising:
a transmitter apparatus for performing transmission using transmission signals generated on the basis of data symbols of a specified transmission method, said transmitter apparatus comprising a first FFT processing part for converting said data symbols to said frequency domain data, an interleaver for generating interleave-processed data being obtained by performing specified rearrangement processes on said frequency domain data converted by said first FFT processing part, and an IFFT processing part for converting said interleave-processed data to time domain signals, said interleaver comprising an interleaver memory having Q rows and N/Q columns, and said interleaver configured to generate and output N data points from Q data points inputted from said first FFT processing part, N being greater than Q, the data points of any column being associated with only one user; and a receiver apparatus for restoring said data symbols on the basis of the received reception signals obtained by receiving said transmission signals, said receiver apparatus comprising a second FFT processing part for converting said received time domain signals to received frequency domain data, a de-interleaver for generating de-interleave-processed data by performing specified rearrangement processes on said received frequency domain data, said de-interleaver configured to generate and output Q data points from N data points inputted to the de-interleaver, N being greater than Q.

11. The communication system according to claim 10, wherein said receiver apparatus further comprises a second IFFT processing part for converting said de-interleave-processed data to time domain signals.

12. The communication system according to claim 10, wherein said second FFT processing part of said receiver apparatus performs N-point FFT processes on N pieces of reception data which have been received and converted from serial to parallel.

13. The communication system according to claim 11, wherein said second IFFT processing part of said receiver apparatus performs Q-point IFFT processes on Q pieces of rearrangement-processed data outputted from said de-interleaver.

14. The communication system according to claim 10, wherein
said de-interleaver is provided with a de-interleaver memory for storing output data of the FFT processing part of said receiver apparatus,
data of N points outputted from the second FFT processing part of said receiver apparatus are written into specified positions in said de-interleaver memory, and
Q data points written into specified positions as data to be processed out of N data points written into said specified positions are read from said de-interleaver.

15. The communication system according to claim 11, wherein specified Q pieces of data read from said de-interleaver memory are outputted to said second IFFT processing part of said receiver apparatus.

16. The communication system according to claim 10, wherein the data symbols of said specified transmission method are spread signals.

17. The communication system according to claim 10, wherein the data symbols of said specified transmission method are multi-carrier signals.

18. The communication system according to claim 10, wherein the data symbols of said specified transmission method are OFDM signals.

19. A communication method being a transmission method for performing transmission using transmission signals generated on the basis of data symbols of a specified transmission method, said communication method comprising:
an FFT processing step for converting said data symbols to frequency domain data;
an interleave-processing step of performing rearrangement processes on said converted frequency domain data; and
an IFFT processing step of converting said frequency domain data to time domain signals;
wherein,
said interleave-processing step generates and outputs N data points from Q data points inputted, N being greater than Q,
said interleave-processing step includes the sub-step of writing Q data points into a column of interleaver memory, the data points of any column being associated with only one user, and, said interleave-processing step further includes the sub-step of reading Q×N/Q data points ordered by row from the interleaver memory to the IFFT processing part.

20. A communication method, comprising:

a transmission step of performing transmission using transmission signals generated on the basis of data symbols of a specified transmission method; and a reception step of receiving transmission signals transmitted by said transmission step and restoring said data symbols, wherein said transmission step comprises the sub-steps of:

an FFT processing step of converting said data symbols to frequency domain data;

an interleave-processing step of performing interleave processes on said converted frequency domain data, said interleave-processing step generating and outputting N data points from Q data points inputted, N being greater than Q, said interleave-processing step including the sub-steps of i) writing Q data points into a column of interleaver memory, the data points of any column being associated with only one user, and ii) reading Q×N/Q data points ordered by row from the interleaver memory; and an IFFT processing step of converting said frequency domain data to time domain signals, and wherein said reception step comprises the sub-steps of:

an FFT processing step of converting said time domain signals to frequency domain data;

de-interleave-processing step of performing rearrangement processes on said converted frequency domain data, said de-interleave-processing step generating and outputting Q data points from N data points inputted, N being greater than Q; and an IFFT processing step of converting said frequency domain data to time domain signals.

* * * * *